United States Patent
Dubé

[11] Patent Number: 5,768,911
[45] Date of Patent: Jun. 23, 1998

[54] REFRIGERATING COMPRESSOR OIL COOLING PROBE DEVICE

[76] Inventor: Serge Dubé, 2595 Bourgogne St., St. Lazare, Quebec, Canada, J0P 1V0

[21] Appl. No.: 758,173

[22] Filed: Nov. 25, 1996

[51] Int. Cl.[6] .................................................. F25B 31/02
[52] U.S. Cl. ........................................... 62/505; 417/372
[58] Field of Search ............................. 62/505, 293, 513; 417/366, 372; 418/85, 86

[56] References Cited

U.S. PATENT DOCUMENTS

| | | | |
|---|---|---|---|
| 3,109,297 | 11/1963 | Rinehart | 62/505 |
| 3,276,221 | 10/1966 | Crumley | 62/505 |
| 3,548,612 | 12/1970 | Mitsubayashi et al. | 62/469 |
| 3,721,108 | 3/1973 | Kocher | 62/505 |
| 4,211,231 | 7/1980 | Rzasa | 62/293 |
| 5,142,875 | 9/1992 | James et al. | 417/372 |
| 5,144,815 | 9/1992 | Ty et al. | 62/505 |
| 5,520,682 | 5/1996 | Baust et al. | 62/293 |
| 5,640,854 | 6/1997 | Fogt et al. | 62/505 |

Primary Examiner—William E. Tapolcai

[57] ABSTRACT

A cooling probe device for cooling oil in a refrigerating compressor is described. It comprises a housing having a coupling for connecting same to a connecting bore of a sealed oil casing of a refrigerating compressor with the housing supported exteriorly of the casing. A pair of refrigerant conduits extend through a chamber of the housing and exit through the coupling a predetermined distance and terminate in a probe to feed a refrigerant gas to the probe through a first of the conduits and out of the probe through a second of the conduits. The predetermined distance of the conduits constitutes a bendable support connection to position the probe immersed in oil contained in the sealed oil casing. The conduits are sealingly connected to the chamber of the housing. The first conduit is adapted for connection to a low-pressure refrigerant gas source, while the second conduit is adapted for connection to a suction line of a refrigeration system whereby cool refrigerant gas is circulated through the probe to cool oil in contact with the probe.

14 Claims, 2 Drawing Sheets

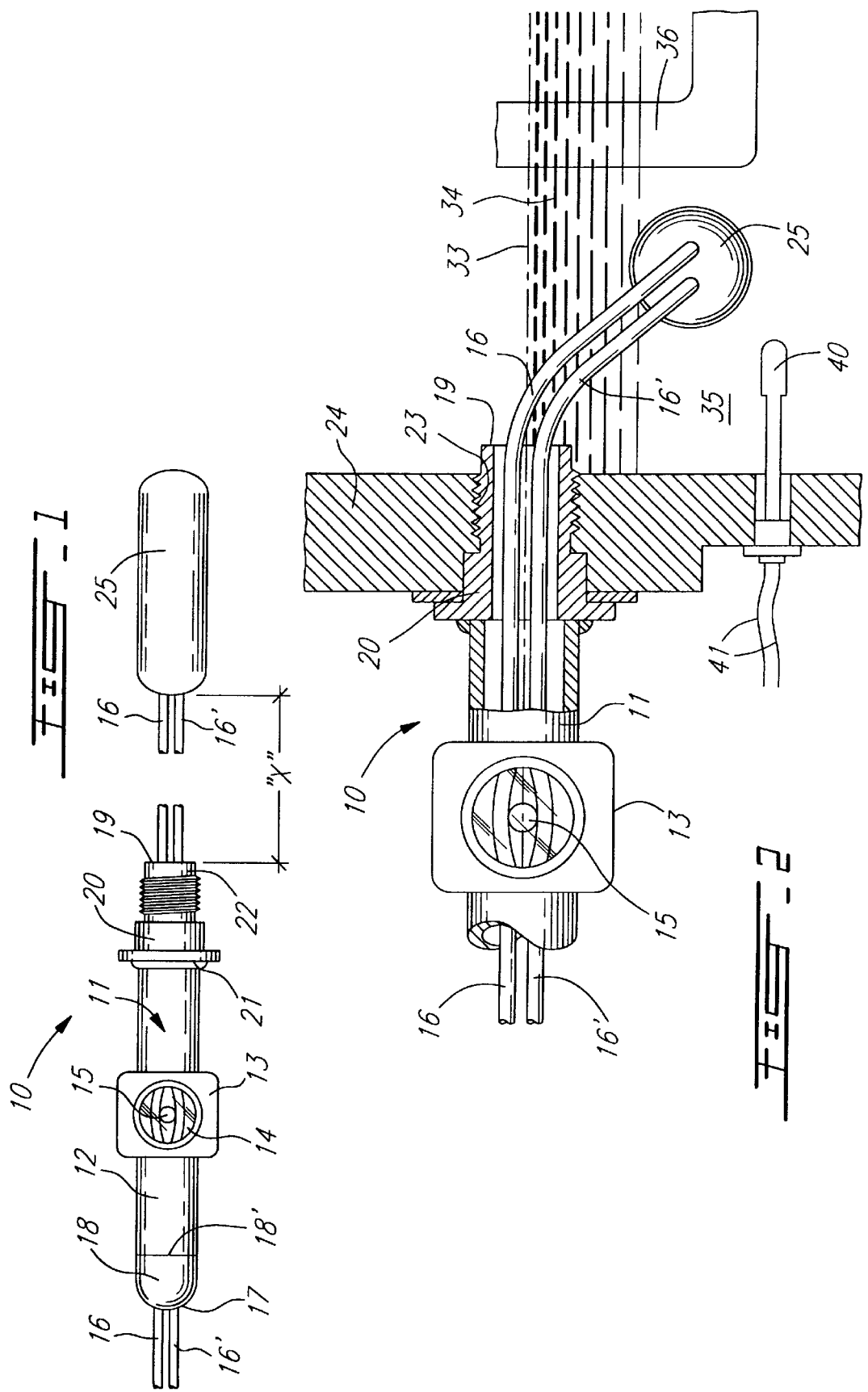

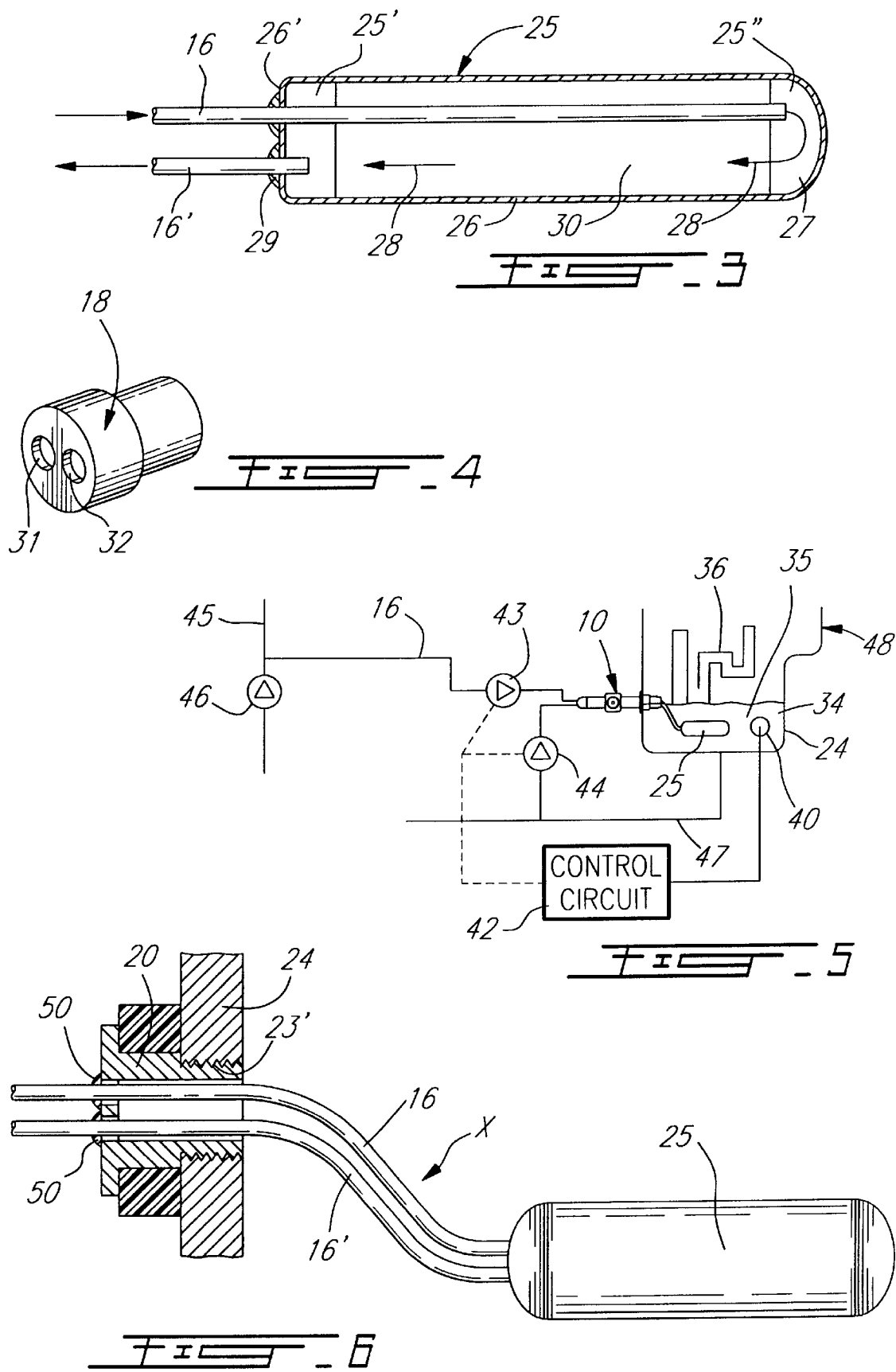

REFRIGERATING COMPRESSOR OIL COOLING PROBE DEVICE

TECHNICAL FIELD

The present invention relates to a cooling probe device securable to the sealed oil casing of a refrigerating compressor and wherein the probe support connection is flexible to locate the probe at a desired position immersed in oil contained within the casing.

BACKGROUND ART

It is known to cool refrigerating compressor oil by securing a cooling coil within the crank case or oil pan of the compressor whereby cool refrigerant may be circulated through the coil to cool the oil therein. Such an oil cooler, for example, is illustrated and described in U.S. Pat. No. 3,548,612, issued on Dec. 22, 1970. However, a disadvantage of such a compressor oil cooler is that the cooling coil is assembled within the compressor housing during assembly thereof and is therefore difficult to repair. Also, if the coil needs to be interchanged it requires dismantling a part of the compressor and the downtime of the system can be extremely long. The cooling coil as described in this patent is also not adaptable to existing compressors nor may it be positioned within a compressor housing wherein there is a space constraint within the casing.

SUMMARY OF INVENTION

It is a feature of the present invention to provide a cooling probe device which is easily adaptable to existing sealed oil casings of refrigerating compressors and which substantially overcome the above-mentioned disadvantages of the prior art.

Another feature of the present invention is to provide a cooling probe device which is securable to the eyeglass port of existing refrigerating compressors and wherein the cooling probe is connected by flexible support conduits permitting the probe to be located at a convenient location within the casing and totally immersed within the oil contained therein to provide effective cooling of the oil.

According to a broad aspect of the present invention there is provided a cooling probe device for cooling oil in a refrigerating compressor. The cooling probe comprises a coupling for connecting same to a connecting bore of a sealed oil casing of a refrigerating compressor. A pair of refrigerant conduits extend freely through the coupling and exit a predetermined distance and terminate in a cooling probe to feed a refrigerant gas in the probe through a first of the conduits and out therefrom through a second of the conduits. The predetermined distance of the conduits constitutes a bendable support to permit the positioning of the probe immersed in oil contained in the sealed oil casing. Sealing means connects the conduits to the coupling after the probe is positioned in the oil. A first conduit is adapted for connection to a low-pressure refrigerant gas source. A second conduit is adapted for connection to a suction line of a refrigeration system whereby cooled refrigerant gas is circulated through the probe to cool oil in contact therewith.

According to a further broad aspect, the present invention provides a cooling probe device for cooling oil in a refrigerating compressor. The cooling probe comprises a housing having a coupling for connecting same to a connecting bore of a sealed oil casing of a refrigerating compressor with the housing supported exteriorly of the casing. A pair of refrigerant conduits extend through a chamber of the housing and exit through the coupling a predetermined distance and terminate in a probe to feed a refrigerant gas therein through a first of the conduits and out therefrom through a second of the conduits. The predetermined distance of the conduits permit the positioning of the probe immersed in oil contained in the sealed oil casing. Sealing means connect the conduits to the chamber of the housing. The first conduit is adapted for connection to a low-pressure refrigerant gas source, while the second conduit is adapted for connection to a suction line of a refrigeration system whereby cool refrigerant gas is circulated through the probe to cool the oil in contact therewith.

BRIEF DESCRIPTION OF DRAWINGS

A preferred embodiment of the present invention will now be described with reference to the accompanying drawings in which:

FIG. 1 is a partly fragmented side view of the cooling probe device of the present invention;

FIG. 2 is a fragmented section view, partly in section, showing the cooling probe device of the present invention connected to a sealed oil casing of a refrigerating compressor;

FIG. 3 is a simplified section view showing the construction of the cooling probe;

FIG. 4 is a perspective end view of the cap-like bushing sealing the conduits to an end of the probe housing;

FIG. 5 is a schematic illustration showing the connection of the cooling probe device to a refrigeration system and wherein an automatic control is associated with the probe to control its operation and hence the temperature of the oil within the compressor casing; and FIG. 6 is a fragmented section view showing a further modification of the construction of the cooling probe device.

DESCRIPTION OF PREFERRED EMBODIMENTS

Referring now to the drawings and more particularly to FIG. 1, there is shown generally at 10 the cooling probe device of the present invention. As hereinshown, the device comprises a housing 11 which is formed from an elongated, straight copper tube section 12 having an eyeglass device 13 secured therein and provided with a window aperture 14 to view the presence of oil within the housing 11. A sensing probe 15 indicates the presence or absence of oil. A pair of flexible copper tubes or conduits 16 and 16' enter the housing 11 from an outer end 17 through a cap-like bushing 18 and exit the probe through an exit end 19 of a coupling 20 secured to the other end of the housing 11. The coupling 20 has a flange 21 and a threaded bushing 22 to be threadedly engaged within a threaded port 23 of a compressor sealed oil casing 24 as shown in FIG. 2. The pair of refrigerant conduits 16 and 16' exit the coupling 20 and extend therebeyond a predetermined distance "x" which constitutes a bendable support connection and terminate in a cooling probe 25.

As shown in FIG. 3, the cooling probe 25 is a sealed cylindrical housing 26 formed from a copper tube section and provided with opposed sealed end bushings 25' and 25''. A first one of the conduits, namely conduit 16, extends in the cylindrical housing 26 from a first end wall 26' of the probe 25 and extends longitudinally therein to terminate close to the second opposite end wall 27 of the probe whereby to release cool refrigerant gas in the cylindrical housing close to that end wall, as indicated by arrow 28. The second conduit 16' is also connected to the first end wall 26' and extends only a short distance therein whereby the cool refrigerant gas will flow throughout the probe, as indicated by arrows 28 and exit through the conduit 16. Accordingly, a refrigerant flow is developed within the cooling probe to maintain it at a cooling temperature and to extract heat from the oil surrounding the housing 26 as will be described with reference to FIG. 2. As can be seen, the first and second conduits 16 and 16' are sealingly secured to the end wall 26' by welding as shown at 29. Accordingly, the probe 25 has a sealed chamber 30.

FIG. 4 illustrates the construction of the cap-like bushing 18 of FIG. 1. As hereinshown, the bushing has a pair of holes 31 formed in an end wall 32 thereof for receiving a respective one of the conduits 16 and 16' in close friction fit therein whereby to permit the tubes to be displaced in and out of the housing 11 whereby the length of the distance "x" at the exit end of the coupling 20, and which constitutes the bendable support connection, can be varied to adapt the cooling probe to various types of compressor housings.

Referring now to FIG. 2 there is shown the cooling probe device 10 of the present invention as secured to a sealed oil casing 24 of a refrigerating compressor. As hereinshown the probe device 10 is sealingly connected by its coupling 20 to the casing 24 and with the eyeglass 13 located conveniently for access. As hereinshown the threaded port 23 which usually contained an eyeglass, such as eyeglass 13 secured therein, is disposed at a level which is substantially in alignment with the top oil level 33 of the oil 34 contained within the reservoir 35 of the casing. Adjacent such port 23 there may be positioned various parts such as a crankshaft connection 36 of the piston train assembly of the compressor and therefore the space between the threaded port 23 and the piston train assembly may be restricted. For this reason, the length "x" of the conduits 16 and 16' exiting the housing 11 are made to be variable prior to the welding of the conduits 16 and 16' to the end wall 32 of the bushing 18.

As shown in FIG. 2, the conduits 16 and 16' exiting the exit end 19 of the threaded end 20 are bent whereby the cooling probe 25 may be positioned sideways with respect to the casing wall 24 and immersed totally below the oil level in the reservoir 35.

When assembling the cooling probe device to position the cooling probe 25 in a difficult area within the reservoir 25, the conduits 16 and 16' and the cooling probe 25 may be disassembled from the housing 11 and the end sections of the conduits close to the probe shaped, as shown in FIG. 2, to support the probe immersed within the oil. This positioning is visible through the threaded port 25 as it is not obscured by the cooling probe housing 11. It can also be determined by analyzing the construction plane of the compressor. Once the position of the probe is defined it is now possible to position the housing 11 about the free ends (not shown) of the conduits 16 and 16' and to thread the housing 11 within the threaded port 23 with proper seals in position. The conduits 16 and 16' are then welded about their respective holes 31 in the end wall 32 of the cap-like bushing 18.

As shown in FIG. 2 a temperature sensing probe 40 may also be connected to the casing 24 and it provides temperature signals through its leads 41 to feed a control circuit 42 as shown in FIG. 5. As shown in FIG. 5 the control circuit controls the operation of a pair of valves 43 and 44 whereby to obstruct the conduits 16 and 16' to shut off the cooling probe should it be desirable to maintain the oil 34 within the reservoir 35 of the compressor casing 24 at a predetermined temperature. As is also shown in FIG. 5, the conduit 16 is connected to the outlet 45 of an expansion valve 46 of a refrigeration system, while the conduit 16' is connected to the suction line 47 of the compressor 48 or any other compressor of the refrigeration system. Accordingly, as previously described, cool low pressure refrigeration gas is fed into the probe through conduit 16 and sucked out of the probe through conduit 16'.

The cooling probe 25 as well as the housing 11 and the cap-like bushing 18 are all constructed from copper material which is easily weldable and which provides excellent seals. The conduits 16 and 16' are also of copper conduits which can be easily bent without damage to the conduits whereby to permit the cooling probe to be easily positioned within the compressor oil casing and in difficult hard-to-reach spaces therein.

Referring now to FIG. 6 there is shown a still further modification of the present invention wherein the cooling probe device consists merely of the conduits 16 and 16' extending through the coupling 20 and being welded thereto, as shown at 50, once the conduit support section "x" has been bent to dispose the probe 25 at a proper position within the casing. With this arrangement there is no eyeglass provided in association with the cooling probe and such an eyeglass may be left at its position on the casing. A threaded bore 23' would then be a machine within the casing 24' of the compressor.

It is within the ambit of the present invention to cover any obvious modifications of the preferred embodiment described herein, provided such modifications fall within the scope of the appended claims.

I claim:

1. A cooling probe device for cooling oil in a refrigerating compressor, said cooling probe comprising a housing having a coupling for connecting same to a connecting bore of a sealed oil casing of a refrigerating compressor with said housing supported exteriorly of said casing, a pair of refrigerant conduits extending through a chamber of said housing and exiting through said coupling a predetermined distance and terminating in a cooling probe to feed a refrigerant gas therein through a first of said conduits and out therefrom through a second of said conduits, said predetermined distance of said conduits permitting the positioning of said probe immersed in oil contained in said sealed oil casing, sealing means connecting said conduits to said chamber of said housing, said first conduit being adapted for connection to a low-pressure refrigerant gas source, and said second conduit being adapted for connection to a suction line of a refrigeration system whereby cool refrigerant gas is circulated through said probe to cool oil in contact therewith.

2. A cooling probe device as claimed in claim 1 wherein said pair of refrigerant conduits are freely displaceable through said housing between said coupling and said sealing means, said sealing means being sealingly secured to said conduits after the determination of said predetermined distance of said conduits.

3. A cooling probe device as claimed in claim 2 wherein said conduits are constructed of metal capable of being bent whereby to define a probe bendable support connection to support said probe immersed in said oil.

4. A cooling probe device as claimed in claim 3 wherein said conduits are copper tubes, said sealing means being a metal bushing having a passage through which said tubes extend, said tubes being welded to said bushing to constitute said sealing means.

5. A cooling probe device as claimed in claim 3 wherein said housing is a straight tube section having an eyeglass device secured thereto to monitor the sufficiency of oil in said sealed oil casing, said coupling being secured at one end of said tube section and is a threaded bushing adapted to connect to a threaded port of an eyeglass device of said sealed oil casing for the replacement thereof, said sealing means being a cap-like bushing sealingly secured to an opposite end of said tube section, said tubes being welded about a passage formed at an end of said cap-like bushing.

6. A cooling probe device as claimed in claim 5 wherein said straight tube section is a copper tube section of circular cross-section, said passage of said cap-like bushing being a pair of holes formed in an end wall thereof for receiving a respective one of said tubes in close friction fit therein, each said tube being welded to said end wall about said holes.

7. A cooling probe device as claimed in claim 5 wherein said probe is a sealed cylindrical housing, said first conduit extending in said cylindrical housing from a first end thereof and terminating therein close to a second end thereof to release said refrigerant gas in said cylindrical housing to cool said cylindrical housing, said second conduit being connected to said first end to create a refrigerant flow in said cylindrical housing between said second end to said first end.

8. A cooling probe device as claimed in claim 7 wherein said cylindrical housing is a copper tube section having opposed sealed end bushings to constitute a sealed probe.

9. A cooling probe device as claimed in claim 1 wherein said first conduit is connected to an expansion valve outlet in a refrigeration system to obtain a source of low pressure cold refrigerant gas.

10. A cooling probe device as claimed in claim 9 wherein said second conduit is connected to the suction line of a compressor.

11. A cooling probe device as claimed in claim 2 wherein there is further provided a temperature sensor connected to said sealed oil casing and disposed in oil contained in said casing to sense the temperature thereof, a control device for receiving temperature signals from said temperature sensor, a valve connected to said first and second conduits and operable by said control device, said control device monitoring and controlling the temperature of oil in said sealed oil casing of said compressor.

12. A cooling probe device for cooling oil in a refrigerating compressor, said cooling probe comprising a coupling for connecting same to a connecting bore of a sealed oil casing of a refrigerating compressor, a pair of refrigerant conduits extending freely through said coupling and exiting a predetermined distance and terminating in a cooling probe to feed a refrigerant gas in said probe through a first of said conduits and out therefrom through a second of said conduits, said predetermined distance of said conduits constituting a bendable support to permit the positioning of said probe immersed in oil contained in said sealed oil casing, sealing means connecting said conduits to said coupling after said probe is positioned in said oil, said first conduit being adapted for connection to a low-pressure refrigerant gas source, and said second conduit being adapted for connection to a suction line of a refrigeration system whereby cool refrigerant gas is circulated through said probe to cool oil in contact therewith.

13. A cooling probe device as claimed in claim 12 wherein said sealing means is a leak-proof weld between said conduits and said coupling.

14. A cooling probe device as claimed in claim 12 wherein said conduits are copper tubes capable of being bent to define a curved support connection for said probe.

\* \* \* \* \*